United States Patent
Peterson, Jr.

[11] 3,797,317
[45] Mar. 19, 1974

[54] SPLIT VALVE TEST PLUG

[76] Inventor: Charles D. Peterson, Jr., P.O. Box 217, Richardson, Tex. 75080

[22] Filed: Dec. 7, 1972

[21] Appl. No.: 312,875

[52] U.S. Cl. .................................. 73/420, 137/317
[51] Int. Cl. ............................................ G01l 19/00
[58] Field of Search .......... 73/420, 368.4; 137/317, 137/318, 315, 226

[56] References Cited
UNITED STATES PATENTS
3,217,733  11/1965  Howard .............................. 137/317

Primary Examiner—Donald O. Woodiel
Attorney, Agent, or Firm—Glenn K. Robbins

[57] ABSTRACT

A split valve pressure test plug is used for high pressure systems of fluids to sense pressure or temperature by means of a test probe. The test probe is connected either to a pressure gauge, thermometer or other sensing device and is received within split valve resilient valve core members in a rigid pressure plug housing. The relilient split valve core members are of a special probe passage construction to receive a test probe through the core in the two split valve members passing through vlave pockets. The split valve construction is comprised of two identical valves working in conjunction with each other. Upon removal of a test probe from a fluid system in which the plug is used, leakage is prevented since one of the split valve closes before the other. Further through the use of a valve retainer in the housing relative movement is provided in one valve upon withdrawal of the probe member through it which will tend to compress the other valve core member which aids in sealing.

7 Claims, 4 Drawing Figures

PATENTED MAR 19 1974 3,797,317

SPLIT VALVE TEST PLUG

SUMMARY OF THE INVENTION

In the past various resilient needle valves or plugs have been provided receiving the needle valve or probe to communicate a high pressure region with a low pressure region. The resilient valve plugs in the past have been designed to prevent leakage but it has been a constant and recurrent problem to provide such a device which is low in cost and simple in use but at the same time is rugged. Further there has been a problem in the use of the test probe such as for temperature sensing through a thermometer in preventing leakage after the thermometer has been left in the resilient valve core member for some time due to set of the rubber of resilient valve core. On removal of the thermometer the rubber valve does not return to its original position rapidly and the plug will leak a spurt of hot water or other fluid in some cases dangerous corrosive fluids to hit an eye with obvious safety problems.

By means of the instant invention there has been provided a simple pressure or temperature testplug which can be tapped into a high pressure line or tank or the like. The plug has two resilient valve cores which may move relative to one another within a valve housing. The valve cores in the split valve core construction readily receive a pressure or temperature test probe. Instead of a test probe it will be also understood that a tubular probe may be employed to drain off fluid of even pump in fluid and the valve is designed for general use. When not in use the valve plug can simply be capped so as to prevent tampering or any other forces that tend to cause malfunction of the plug and pressure or fluid loss within the system to be tested.

The valve core members are identical in construction and are both of frustoconical configuration and simply seat under pressure within the rigid housing of the pressure test plug when the core is forced into the cylindrical opening of the valve body. Each core is provided with a top split in which the sides of the slits are urged and biased toward one another by the close fit of valve core within the core housing. The cores have insertion guides with diameters slightly smaller than the diameters of the thermometers of pressure probe to prevent leakages past the probe during insertion. This structure acts like an O-ring to prevent leaking. The slit through which the probe passes extends from the top of the core through the longitudinal axis of the valve core to a valve pocket at the bottom. A valve pocket in the upper valve core adds pressure protection and better sealing when butted against the lower valve core.

Through the use of two identical valves in the split valve construction of this invention both valve core members act to provede sealing of the test probe. Upon removal of the test probe such as thermometer or the like the lower valve closes before the upper valve which makes the entire unit reseal quite rapidly. The lower valve will tend to compress the upper valve as the pressure probe is pulled through it which aids in the sealing of the upper valve. This feature is provided through the function of the relative movement of the lower valve core member within the housing due to the spacing from the valve retainer. At the other end of the valve housing a 90° or square shoulder acts as a stop for the valve core member. The valve pocket also acts as a reservoir to trap fluid from the upper valve core. The test plug functions extremely well on high pressure systems and also on negative pressure or vacuums through the use of the split valve core construction.

The test plug by virtue of a threaded portion at the bottom of the housing can readily be tapped into a pressure line or container or any type for measuring pressure or temperature of various types of fluids whether they be gases or liquids. No tie-up of equipment is involved since the pressure guage or temperature sensing device can be moved from one pressure test plug area to another without the requirement of any permanent or semipermanent connections. The plug is simple in construction and easy to manufacture and rugged in use without any special training or tools required for installation.

The above features are objects of this invention and further objects will appear in the detailed description which follows and will be otherwise apparent to those skilled in the art.

For the purpose of illustration of this invention there is shown in the accompanying drawings a prefered embodiment thereof. It is to be understood that these drawings are for the purpose of example only and that the invention is not limited thereto.

DESCRIPTION OF THE INVENTION

Figure 4:
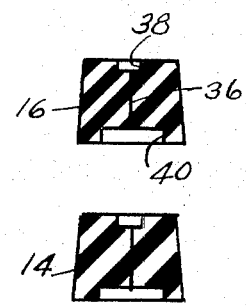
FIG. 4 is in view in longitudenal section of the split valve core in exploded relation before it is inserted in the housing.
Figure 1:
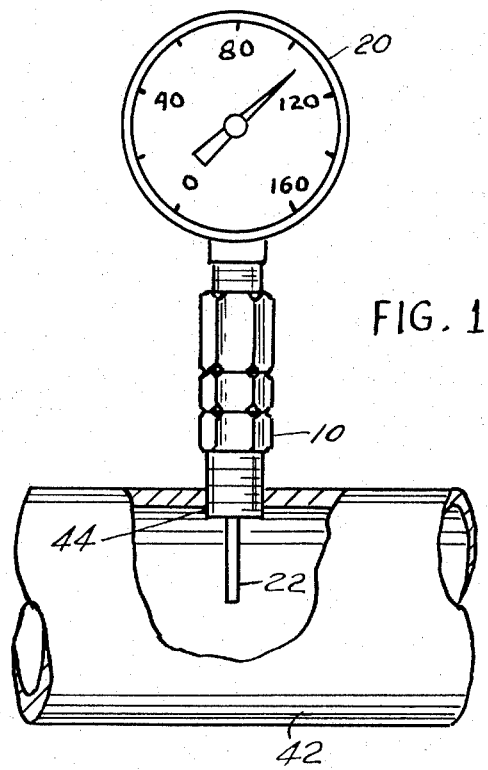
FIG. 1 is a view in elevation of a pressure line equipped with the test plug of this invention receiving a pressure gauge and probe.
Figure 2:
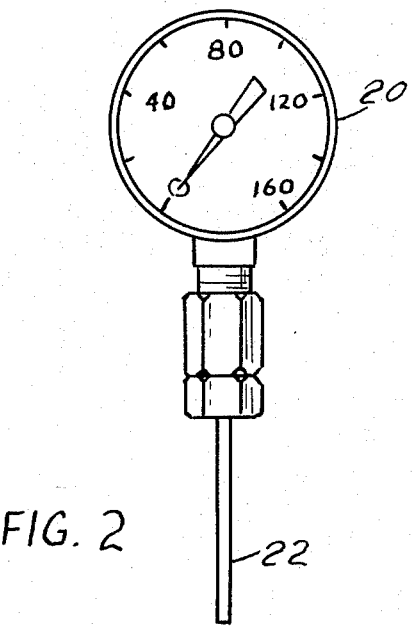
FIG. 2 is in view in elevation of the pressure gauge equipped with a test probe before insertion in the test plug.
Figure 3:
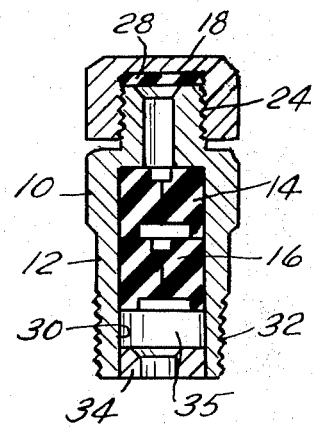
FIG. 3 is an enlarged view in longitudenal section of the test plug fitted with a cap.

The test plug of this invention is generally indicated by the reference numeral 10 in FIGS. 1 and 3. It is comprised of a valve body or housing 12, resilient valve cores 14 and 16 and a protective cap 18. It is shown in use with a pressure gauge 20 in FIGS. 1 and 2 connected to a tubular probe 22 adapted to be inserted through the split valve core members.

The valve body 12 as best shown in FIG. 3 is comprised of rigid metallic housing is made of a material such as brass or the like to prevent corrosion. An upper portion 24 is exteriorly threaded to receive the protective cap 18. It is in the form of a neck of reduced diameter such that the valve cap fits on the valve body with the side wall in flush engagement. A resilient seal 28 is provided in the cap to minimize any posibility of leakage should the valve core become damaged.

The valve housing 12 has an enlarged interior opening which receives two or more valve cores. The bottom portion of the valve housing is exteriorly threaded at 32 so as to be received in a threaded tapped opening in a wall of a high pressure pipeline to be sensed or any other type of environment such as a tank autoclave or the like to sense temperatures or pressures. A retaining member 34 is fitted in the lower end of the valve housing and is spaced 35 from the lower valve core member 16 a sufficient distance to provide a free area for the resilient core members to expand as the probe is pushed through the valve core members and to prevent dislodgement of the valve core members. This also facilitates the relative movement provided for the valve cores for the insertion of the test probe and also its withdrawal.

The two valve core members 14 and 16 are identical in construction. The valve core 14 is comprised of frustoconical body of resilient material such as neoprene, rubber or the like. It has a longitudinal slit 36 to provide an opening passing through the axis of the valve core to receive needle probe 22. The slit start at the cup shaped top opening 38 which has a cylindrical configuration to provide for self centering of the needle probe. The opening 38 has a diameter just slightly less than that of probe to provide for sealing as well as ready insertion. The slit starts at the opening 38 and at the bottom terminates in a valve pocket 40 which is somewhat larger than the diameter of the needle probe and has a generally cylindrical configuration.

USE

The pressure plug of this invention is adapted for simple installation and use in a high pressure line or container for fluids such as gases or liquids and in pressure vessels or the like whereever temperatures or pressures or other environments are desired to be sensed from on side of the wall to the other side. Thus the pressure or temperature or any other condition can be sensed from one side of the wall to the other by simple insertion of the tube probe 22 which senses one side of the wall and transmits the sensed condition to the other side by connection either to a pressure gauge, thermometer or any other type of sensing device.

Installation is effected for example in a high pressure pipe line 42 as shown in FIG. 1 by simply tapping an opening 44 in a wall and providing it with threads. The lower threaded end 32 of the valve housing is then simply threaded into the opening and tightened by a wrench around the hexagonal top portion of the valve housing. The pressure test plug is then ready for use.

For the installation in FIG. 1 of the pressure gauge 20 the tubular probe 22 is connected to the gauge and simply inserted through the neck 24 at the top of the housing and into the slits 36 in the upper valve core member 14 and the lower valve core member 16. The probe is pushed through the two valve members and relative movement of the core members toward the valve retainer is effected which eases and facilitates the movement of the probe through the core members while retaining full sealing. The probe is then passed into the interior of the pipe line or condut to complete the installation. The pressure gauge 20 will then sense the pressure within the pipe line. After the desired use of the pressure gauge or thermometer as the case may be or any other sensing device has been completed the device is then simply removed and thecap 18 is then connected to the top of the test plug until it is desired to be used again.

Upon the removal of the probe a special sealing function takes place. In the withdraw of the probe first the lower valve core member 16 closes before the upper valve 14 to prevent any passage of fluid through the two valve core members. The first closing of the lower valve core member 16 makes the entire unit reseal quite rapidly. The lower valve member tends to compress the upper valve member as the probe is pulled through it which aids and facilitates the sealing as pressure is applied to the upper valve member 14 to compress it. This however, is not completely required as the upper valve 14 will seal on its own. The valve pocket 40 in the upper valve core also acts as a reservoir to contain any leaking fluid. The entire test plug with the two split valve core members functions quite well on negative pressures and vacuums because of the two phase closing of the valve core members.

The two resilient valve core members 14 and 16 with the protective valve pockets 40 and the insertion guides 38 provide for simple insertion of the needle probe. The pockets 40 insure against leakage with the construction of this invention and by virtue of this split valve construction a highly efficient seal has been provided when the probe is used.

Various changes and modifications may be made within this invention and will be readily apparent to those skilled in the art. Such changes and modifications are within the scope and teaching of this invention as defined by the claims appended hereto.

What is claimed is:

1. A pressure test plug comprising a rigid housing adapted to be connected through a wall from a low pressure side to a high pressure side, said housing receiving in radially compressed relation a plurality of resilient valve cores arranged in tandem, each core having a passage for a tubular probe, said passage comprising a normally closed slit, said slit removably receiving the tubular probe from the low pressure side in sealing relation characterized in that the core members are axially moveable in the housing and with respect to each other.

2. The pressure test plug of claim 1 in which a valve retainer is spaced at one end of the valve housing from the core members to provide for relative axial movement of the core members in the housing and a free area in which to expand.

3. The pressure test plug of claim 1 in which the slit is connected with an enlarged valve pocket at a lower end of the valve core member.

4. The pressure test plug of claim 1 in which an upper end of the core member has a probe guide communicating with the slit, said guid comprising a shallow cylindrical opening having a diameter slightly less than the diameter of the probe to provide for sealing thereof.

5. The pressure test plug of claim 3 in which the valve pocket is comprised of a cylindrical opening having a diameter greater than the diameter of the probe.

6. The pressure test plug of claim 3 in which an upper end of the core member has a probe guide communicating with the slit, said guide comprising a shallow cylindrical opening having a diameter slightly less than the diameter of the probe to provide for sealing thereof.

7. The pressure test plug of claim 6 in which a valve retainer is spaced at one end of the valve housing from the core members to provide for relative movement of the core members in the housing and a free area in which to expand.

* * * * *